United States Patent [19] [11] Patent Number: 4,933,713
Tsuji et al. [45] Date of Patent: Jun. 12, 1990

[54] PHOTOGRAPHIC PRINTING METHOD AND APPARATUS THEREFOR

[75] Inventors: Junichi Tsuji; Yoichi Ujiie, both of Kanagawa, Japan

[73] Assignee: Fuji Photo Film Co., Ltd., Kanagawa, Japan

[21] Appl. No.: 226,509

[22] Filed: Aug. 1, 1988

[30] Foreign Application Priority Data

Jul. 31, 1987 [JP] Japan .................... 62-191682

[51] Int. Cl.[5] .............................. G03B 27/52
[52] U.S. Cl. .................................. 355/41; 355/68; 355/77
[58] Field of Search ............... 355/38, 40, 41, 68, 355/77, 317

[56] References Cited

U.S. PATENT DOCUMENTS 4,485,949 12/1984 Gebhart et al. ............... 355/317 X
4,727,399 2/1988 Matsumoto ................... 355/68
4,806,990 2/1989 Tahara .......................... 355/41 X Primary Examiner—L. T. Hix
Assistant Examiner—D. Rutledge
Attorney, Agent, or Firm—Sughrue, Mion, Zinn, Macpeak & Seas

[57] ABSTRACT

A photographic printing method and apparatus therefor having a pulse motor for transporting a photograhic film to place a picture frame in a printing position. In order to avoid an occurrence of cumulative position error, position data of each picture frame is provided in the form of a combination of the number of perforation holes and the number of driving pulses applied to the pulse motor while edges of each two adjacent perforation holes are detected. In a film inspection process, the position data is stored in a memory after having placing each picture frame in the printing position. The position data of each picture frame is read out in a printing process and compared with present position signals of the picture frame of the film being transported. Upon an occurrence of coincidence between the position data read out from the memory and the position data presently detected, the pulse motor is controlled to stop, thereby placing the picture frame in the same printing position as where the picture frame is placed in the inspection process.

15 Claims, 7 Drawing Sheets

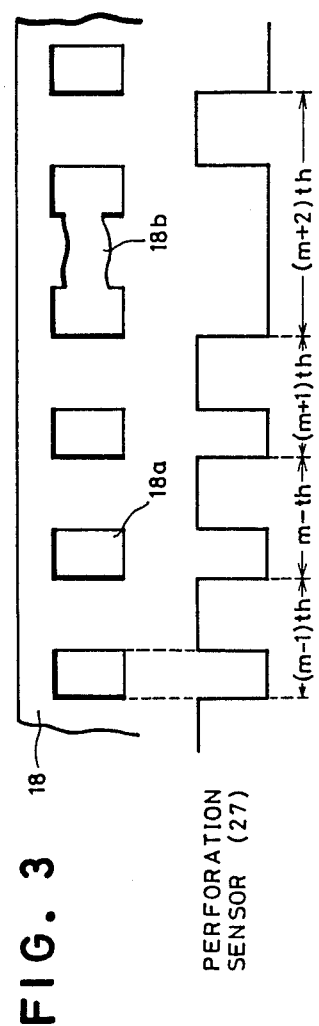
FIG. 3
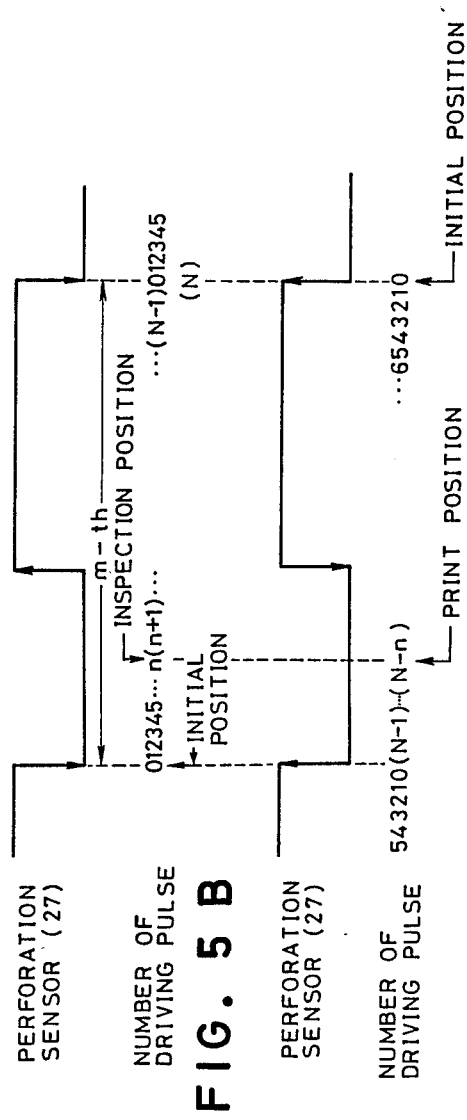
FIG. 5A
FIG. 5B

PHOTOGRAPHIC PRINTING METHOD AND APPARATUS THEREFOR

BACKGROUND OF THE INVENTION

The present invention relates to a photographic printing method and an apparatus therefor.

In large scale photofinishing laboratories developed photographic films, having a plurality of picture frames formed thereon, are inspected to determine correction values for each picture frame. Such photographic films are formed with a notch for indicating a reference position, and the correction values of each picture frame are effected by the use of a notch puncher before making prints therefrom. When printing, a film is measured to detect characteristic values of each picture frame before placing the picture frame of the film in a printing or exposure position. Then, the picture frame of the film is placed in the printing position so as to be exposed with an exposure level according to the exposure correction values and to the characteristic values. Such a photographic printer is provided with a notch sensor disposed before a picture frame is placed in a printing position to detect each notch formed in the film. The transportation or movement of the film is controlled based on a distance between the notches which indicates the reference position, and which is detected by counting driving pulses applied to a pulse motor. A specific picture frame and the correction value of the specific picture frame are determined by the counted number of notches.

In recent years, various photographic printing systems (i.e., so called mini-labo (mini-laboratory) systems) have become widespread. These systems are simplified systematically in their operation in order to make prints with ease.

Such systematized mini-labo photographic printers are so structured as to place picture frames in a printing position for effecting an image inspection and for printing frame by frame. In such a frame inspection, the film is inspected visually to determine whether each picture frame of a negative film is placed in a proper position and whether a picture frame will possibly fail or not be printed during the printing process. According to the result of this inspection, a position correction is induced if a picture frame is placed with a deviation from the printing position, and exposure correction data is entered in the photographic printer through correction keys for a picture frame which is evaluated to possibly produce a failure in its print. After this inspection, when a print key is operated, the picture frame is measured to detect a density or light transmittance so as to calculate exposures for three colors based on the measured density or light transmittance and on the previously entered exposure correction data. Thereafter, printing control is effected according to the calculated exposures to make a print of the picture frame.

In such printing systems, since each picture frame is placed in the printing position only once for effective inspection and printing alternately, the photographic printer restricts the operator for a long time, resulting in a high printing cost.

In an attempt at solving such problems in association with those photographic printers, there is disclosed in, for example, Japanese Patent Unexamined Publication No. 61-91,648 a printing method in which a film is first transported in one direction to inspect picture frames thereof one by one and, thereafter, in the opposite direction to print each picture frame. In each of the inspection and print processes, the picture frames of the film are positioned in a correct printing position. For the positioning of film, a notch sensor is used to detect notches which are provided previously on the film. More particularly, one notch is provided for each picture frame in order to automatically position the picture frame in the printing position.

A problem associated with such a photographic printing method is that when a positioning notch of an associated picture frame deviates from the center line thereof, it is difficult for the picture frame to be automatically placed in a correct position. In addition, such a photographic printing method is hardly applicable to mini-labo systems in which no notches are formed in films.

In order to avoid these problems in association with the conventional printing methods, there has been disclosed in Japanese Patent Application No. 61-244,357, filed by the same applicant as this application, a method in which a film is transported by a pulse motor and is placed in the print position by counting driving pulse applied to the pulses motor. In this method, each picture frame of the film is, after a manual position correction, if needed, positionally specified by storing the number of the counted driving pulses as position data in a memory. In a print process, the position data is read out from the memory, and by using the position data, the picture frame is automatically placed in the printing position.

In this method, of a pulse motor is used to move the film, and the use of the number of driving pulses applied to the pulse motor as position data problems occur is used. More specifically, since a position error increases cumulatively if the pulse motor pulls out, it becomes hard to place each picture frame in position once the pulse motor pulls out. Furthermore, in the case of using the number of driving pulses applied to the pulse motor as position data, a great number of driving pulses are counted and, therefore, a large capacity of memory is necessary to memorize position data.

It is therefore an object of the present invention to provide a photographic printing method and an apparatus therefor in which no cumulative position error occurs, and in which only a small capacity of memory is needed to store memory position data for a large number of picture frames.

SUMMARY OF THE INVENTION

According to a particular feature of the present invention, the photographic printing method includes the steps of: automatically controlling a pulse motor to transport a photographic film so as to correctly place each picture frame of the photographic film in a printing position, manually actuating the pulse motor, if needed, to correct the position of a picture frame by means of fine adjusting keys. counting perforation holes formed in the film and driving pulses applied to the pulse motor after an edge of each perforation hole is detected as a reference position to provide the combination of the counted numbers (i.e., the counted number of perforation holes and the counted number of driving pulses) as position data for each picture frame placed in the printing position, storing the position data in a memory in an inspection process, and reading out the position data of the picture frame to control the pulse motor so as to each of the picture frames in the correct printing position during the print process.

The photographic printer according to the present invention comprises a pulse motor for transporting a photographic paper, means for applying a predetermined number of driving pulses to the pulse motor thereby to transport the film a predetermined length in one direction during an inspection process, means for slightly turning the pulse motor for moving the film to a correct position, a perforation sensor for detecting perforation holes of photographic film to provide square wave signals, leading edge detecting means for detecting a leading edge of the square wave signal so as to detect a leading edge of each perforation hole, thereby providing a leading edge signal, trailing edge detecting means for detecting a trailing edge of the square wave signal so as to provide a trailing edge signal, a perforation counter which is adapted to count up perforation holes when receiving the trailing edge signal provided from the trailing edge detecting means in the inspection process and to count down perforation holes when receiving the leading edge signal provided from the leading edge detecting means in the print process, a driving pulse counter which is synchronized with the perforation counter so as to be reset for counting driving pulses applied to the pulse motor, means for calculating the difference (N - n) between the number N of driving pulses counted between two adjacent perforation holes, and the number n of driving pulses counted by the time each picture frame is placed in the printing position, a memory for storing position data of each picture frame in the printing position. The position data represents a combination of the difference (N - n) and the counted number of the perforation counter, motor control means for rotating the pulse motor in the opposite direction until the present position data of a picture frame to be printed coincides with the position data of the picture frame read out from the memory, thereby placing the picture frame correctly in the printing position.

According to a particular feature of the present invention, the transported length of a photographic film is measured roughly by counting perforation holes of the photographic film, and is measured finely by counting driving pulses applied to the pulse motor between two adjacent perforation holes. The counted number of perforation holes and the counted number of driving pulses are combined and stored as position data for each picture frame placed in the printing position during the inspection process. The stored position data is read out from the memory to control the pulse motor in the print process, so that each picture frame is placed automatically in the printing position with a high degree of accuracy.

Because the counted number of perforation holes and driving pulses are combined as position data, the present invention is free from a cumulation of positioning errors and, furthermore, needs only a small capacity of memory for storing position data.

BRIEF DESCRIPTION OF THE DRAWINGS

FIG. 3 is a chart showing the wave form of a signal provided by the perforation sensor of FIG. 2:

FIG. 5 (A) and (B) are charts showing the correlation between the wave form of the signal provided by the perforation sensor and driving pulses applied to the pulse motor in an inspection and a print process, respectively:

DETAILED DESCRIPTION OF THE INVENTION

Figure 1:
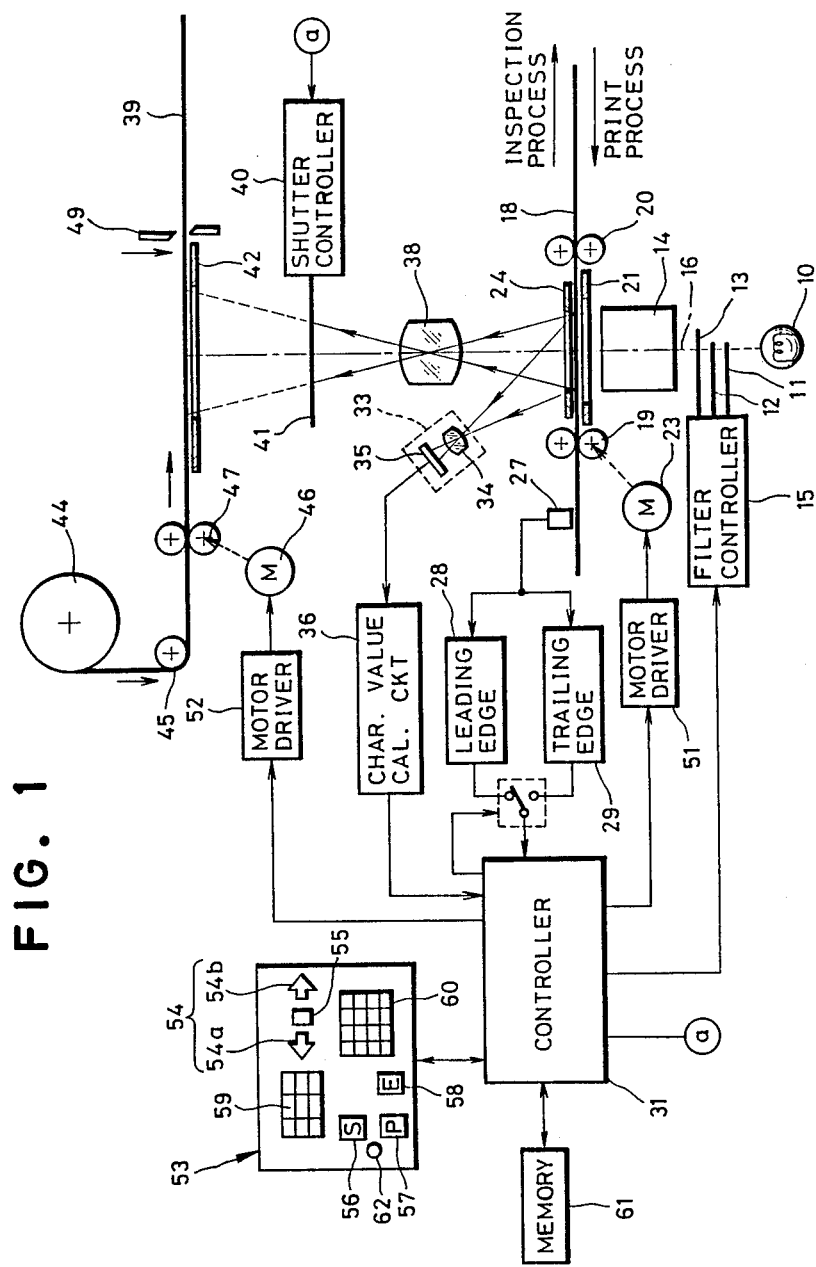
FIG. 1 is a schematic block diagram showing a photographic printer according to a preferred embodiment of the present invention.

Referring to FIG. 1, there is shown a photographic printer according to a preferred embodiment of the present invention. In FIG. 1, there are three complementary color filters 11, 12, 13, namely cyan, magenta and yellow respectively. Each color filter 11, 12, and 13 is controllably insertable, independent of the other two, into a printing path 16 between an illumination lamp 10 and a mirror box 14 which comprises a square hollow tube having inner mirrored walls and top and bottom diffusion plates. The white light from the lamp 10 passes through the color filters 11, 12, or 13 into the mirror box 14 and is diffused thereby. The diffused light, after passing through a color original or color negative film 18 placed between a negative carrier 21 and framing mask 24 so as to be placed flat in a printing position, is focused on a color photographic paper 39 by means of a printing lens 38 to create a latent image of the negative film 18 under the control of a shutter 41 which is controlled by a shutter control 40 to open for a certain amount of time. After exposure, the color photographic paper 39 is withdrawn from a roll paper supply 44 by one frame by means of withdrawing rollers 47 which is actuated by an electric motor 46 to place an unexposed part thereof in a printing position defined by a framing mask 42. After the framing mask 42, there is a cutter 49 for cutting the exposed part of the color photographic paper 39 into a strip including a predetermined number of exposed frames which, in turn, is sent to a photographic processing section (not shown).

The negative film 18 is transported in a direction from the left to right as viewed in FIG. 1 when being inspected, and in the opposite direction when being printed, by means of two pairs of motor driven rollers 19 and 20 disposed on the opposite sides of the printing position and synchronized with each other. The rollers 19 and 20 are driven by a reversible pulse motor 23 under the control of a motor driver 51.

Figure 2:
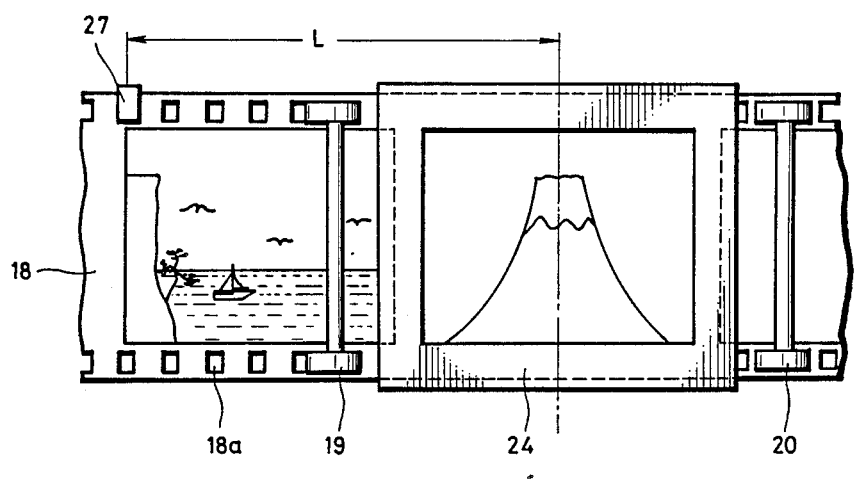
FIG. 2 is an illustration showing the arrangement of a perforation sensor used in the photographic printer of FIG. 1.

Adjacent to the rollers 19, there is a perforation sensor 27 which detects perforation holes 18a formed along a marginal portion of the negative film 18 as shown in FIG. 2 to provide pulsed signals shown as in FIG. 3, with generally one pulse being provided for each perforation hole. This perforation sensor 27 is disposed a distance L from a center line of the framing mask 24. The distance L may be of any length. However, if the distance is too long the detection of perforation holes will be too quick. Consequently, setting the distance L as short as possible is preferable. In this embodiment, the distance L is set to a length of one and a half frames which includes 12 perforation holes. For the perforation sensor 27, either a reflection type or a transmission type of photosensor may be used.

The output signal from the perforation sensor 27 is sent to both a pulse trailing edge detection circuit 29, and a pulse leading edge detection circuit 28 in order to detect an edge of a perforation hole 18a after either the trailing edge or the leading edge of each pulse signal is sensed. The circuits 28, 29 provide an edge signal when detecting an edge, and send it to a controller 31 through a switch 30 which is changed by the controller 31 to select one of the detection circuits 28 and 29 according to a direction in which the pulse motor 23 rotates. More specifically, the switch 30 selects the pulse trailing edge detection circuit 29 when the pulse motor 23 rotates in the direction in which the negative film 18 is transported from the left to the right for negative inspection, and selects the pulse leading edge detection circuit 28 when the pulse motor 23 rotates in the opposite direction in which the negative film 18 is transported from the right to the left for printing.

Located near the printing position is an image scanner 33 comprising a lens 34 and an image area sensor 35 to detect the light passed through points of the negative film placed in the printing position. Outputs from the image scanner 33 are sent to a characteristic value calculation section 36 in order to obtain characteristic values such as a large area transmittance density, and a maximum and a minimum density for each color which, in turn, are transmitted into the controller 31.

The rotating directions and the amount of rotation of the pulse motors 23 and 46 are controlled by controller 31 through the motor drivers 51 and 52. respectively. The controller 31 comprises a microcomputer, and determines an exposure level based on the characteristic values and correction values as well as controls the filter controller 15 and the shutter controller 40. A keyboard 53 connected to the controller 31 has various keys, such as, fine positioning means 54 comprising backward and forward movement keys 54a and 54b for making a fine adjustment of the position of the negative film 18, a pass key 55 for transporting the negative film 18 by one frame, an inspection key 56 for initiating an inspection process, a print key 57 for initiating a print process, an inspection end key 58, correction keys 59 for entering data for density and color correction, alphabetical and numerical keys 60, and an indicator 62. The controller 31 also is connected to a memory 61.

Figure 4:
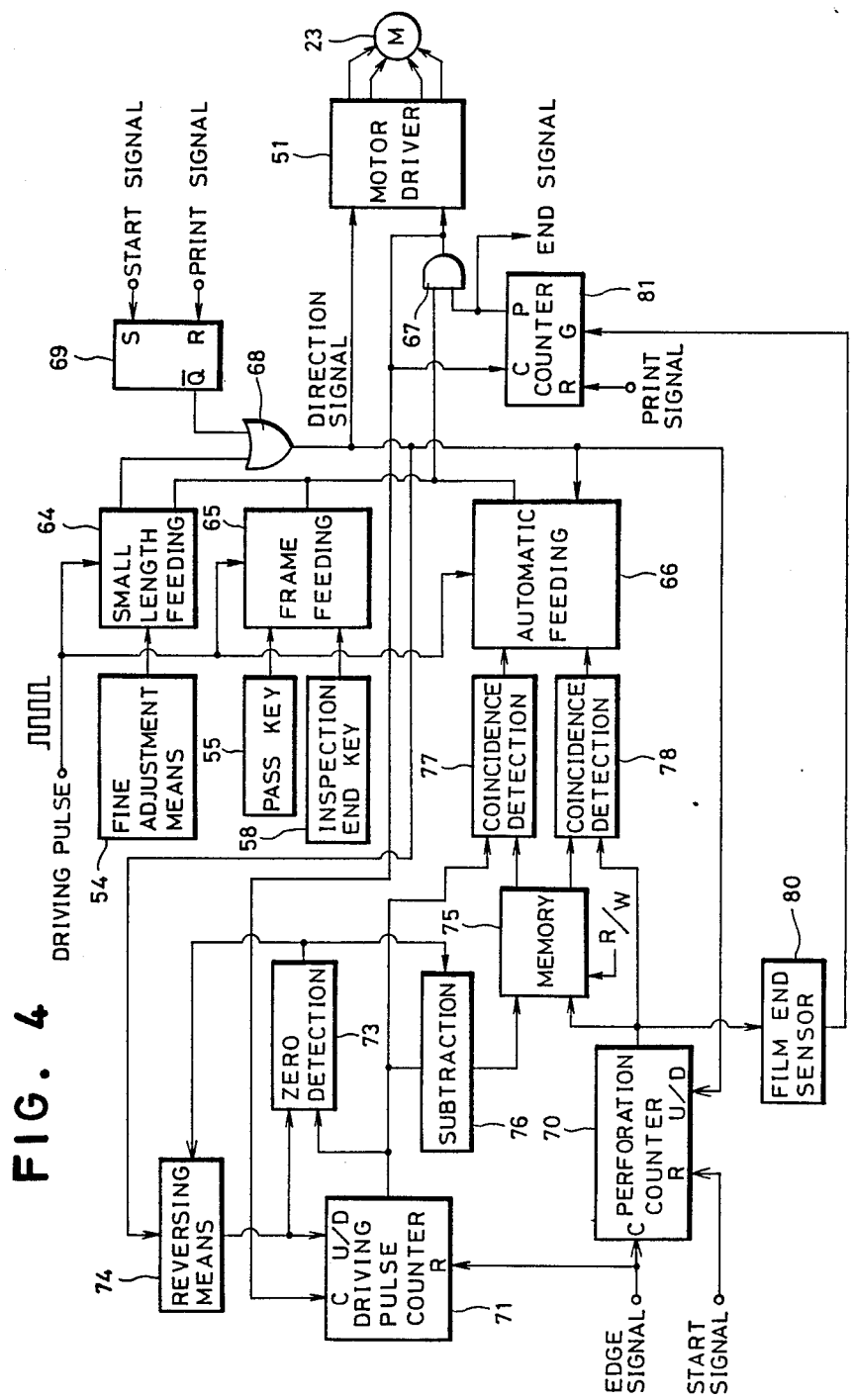
FIG. 4 is a functional block diagram showing a controller for a pulse motor.

Referring to FIG. 4, there is shown a controller for the reversible pulse motor 23. A series of motor driving pulses is applied to a small length feed control section 64, a frame feed control section 65 and an automatic feed control section 66. The small length feed control section 64 is caused by the operation of the fine positioning means 54 to divide the frequency of the series of motor driving pulse. The divided motor driving pulses are sent to the motor driver 51 through an AND gate 67 for rotating the pulse motor 23 at a slow speed so as to finely adjust each picture frame of the negative film 18 to the proper printing position. The backward movement key 54a of the fine positioning means 54 provides a driving direction signal which causes the OR gate 68 to provide the motor driver 51 with a low level signal "L". Alternatively, the forward movement key 54b of the fine positioning means 54 provides a driving direction signal which causes the OR gate 68 to provide the motor driver 51 with a high level signal "H". The motor driver 51 controls the pulse motor 23 to turn in a forward direction under the application of the signal "L", and in the reverse direction under the application of the signal "H". The frame feed control section 65 transmits a predetermined number of motor driving pulses to the motor driver 51 through the AND gate 67 to transport the negative film 18 by one frame when the pass key 55 or the inspection end key 58 is operated. It is noted that the transporting length of one frame depends on the frame size of the negative film, for example, a full-size frame or a half-size frame. In order to prevent the pulse motor 23 from being pulled out, the frame feed control section 65 divides the series of motor driving pulses so as to control the pulse motor 23 to be accelerated upon starting and to be decelerated upon stopping.

A flip-flop 69 is in a set state in the inspection process and in a reset state in the print process. An output signal from the flip-flop 69 is sent to the motor driver 51 through the OR gate 68 to control the direction of rotation of the pulse motor 23.

Further, there is provided in the controller of FIG. 4, a perforation counter 70 and a driving pulse counter 71. These counters 70 and 71 serve to detect a present position of the negative film 18. The perforation counter 70 counts the perforation holes 18a detected by the perforation sensor 27 so as to direct roughly a transported length of the negative film 18, and the driving pulse counter 71 detects the driving pulses so as to detect a transported length of the negative film 18 which is smaller than a distance between two adjacent perforation holes 18a. Based on the combination of the counted numbers by the perforation counter 70 and the driving pulse counter 71, data representing a fine position of the negative film 18 is obtained.

The perforation counter 70 receives the output signal of the OR gate 68 at its up/down terminal (U/D) to count up the edge signals when the pulse motor 23 rotates in the forward direction, or to count down the edge signals when the pulse motor 23 rotates in the reverse direction, and is reset with a start signal.

The driving pulse counter 71 counts up driving pulses when the pulse motor 23 rotates in the forward direction or down when in the reverse direction. When a zero detection section 73 detects that the driving pulse counter 71 has counted down to zero, reversing means 74 causes the driving pulse counter to temporarily reverse the up/down counting condition thereof not only in order to prevent the driving pulse counter 71 from counting down after counting down to zero when moving back the negative film 18 (i.e., by operating the backward movement key 54a while inspecting the negative film 18), but also in order to enable the driving pulse counter 71 to position the last picture frame of the negative film 18 whose perforation holes 18a cannot be detected by the perforation counter 70 by counting down driving pulses. Therefore, either when the negative film 18 is moved back more than a length between two adjacent perforation holes or when the negative film 18 is moved back at the beginning of the print process, the driving pulse counter 71 is reversed again to count up just after counting zero. If the pulse motor 23 is reversed in the direction of rotation while the driving pulse counter is reversed, the reversing means 74 is suspended, so as to allow the driving pulse counter 71 to count up or down according to the direction of rotation of the pulse motor 23.

As is shown in FIG. 5, because the negative film 18 is transported in opposite directions between inspection and print processes, the driving pulse counter 71 changes its counting state, namely from the counting up state to the counting down state or from the counting down state to the counting up state and the perforation sensor 27 detects each perforation hole, with the rear edge first. Therefore, even though the negative film 18 is positioned in a same position between the inspection and print processes, the position data becomes different from each other.

In order to avoid the difference of position data, the switch 30 is operated to select either the pulse trailing edge or the pulse leading edge detection circuits 28 or 29 according to the direction of rotation of the pulse motor 23, and a subtraction section 76 is provided to invert the number of counted driving pulses by the driving pulse counter 71. For example, assuming that the counted number of driving pulses by the driving pulse counter 71 is n when the negative film 18 is in the printing position, and the counted number of driving pulse counted between edges of each perforation is N, the subtraction section 76 performs the calculation of (N - n). In other words, in FIG. 5A, the perforation sensor 70 detects N driving pulses between adjacent trailing edges of a first and a second perforation hole 18a, and the driving pulse sensor 71 detects n driving pulses from the first perforation hole until the negative film 18 is positioned in a correct inspection/printing position. Since during printing, the film 18 is moved in an opposite direction to that when the film moves in the inspection process, the printing/inspection position will correspond to position (N-n) during the printing process as shown in FIG. 5B. Although the number N is generally constant, if part 18b between perforation holes is broken as is shown in FIG. 3, then the number N is determined by the number of driving pulses counted between the two adjacent perforation holes connected by the broken part 18b. Therefore, the subtraction section 76 calculates the difference between the number of driving pulses counted by the driving counter 71 for the edges of a perforation upon the inspection of the negative film 18 and the counted number of driving pulses upon resetting the driving pulse counter 71 (i.e., the number of driving pulses between adjacent perforation holes 18a which is equal to N), and then the difference between N and the counted number n of driving pulses when the negative film 18 is in the printing position. In such a way, the amount of negative film 18 transported from edge to edge is detected independently from such a broken part 18a between perforation holes 18a.

In the case of either moving back the negative film 18 more than one perforation hole for positioning it or the last picture frame of the negative film 18 for which the perforation counter 70 counts no perforation holes, the counted number of driving pulses by the driving pulse counter 71 is stored in the memory 75 without being subjected to any subtractive calculation. The storage of the counted number by the driving pulse counter 71 in the memory is effected when the zero detection section 73 provides the subtraction section 76 with a zero detection signal.

In the inspection process, the counted number of perforation holes by the perforation counter 70 and the result of subtraction in the subtraction section 76 are inputted and stored as data on a position of each frame in the memory 75. In the example shown in FIG. 5, the frame position data is given by the number of perforation holes and the number of driving pulses (N - n). On the other hand, in the print process, the memory 75 reads out the frame position data stored therein upon inspection and sends separately the data of the number of perforation holes m to a coincidence detection circuit 78 connected to the perforation counter 70, and the data number of driving pulses (N - n) to a coincidence detection circuit 77 connected to the driving pulse counter 71.

The automatic feed control section 66 is enabled (i.e. rendered active) with a signal from the OR gate 68 only during the inspecting process so as to send driving pulses to the motor driver 51 either with or without dividing them in frequency. The automatic feed control section 66 controls the pulse motor 23 to reverse the direction of rotation, and to rotate at an increasing speed and then at a constant speed. When the coincidence detection circuit 78 provides a coincidence signal, the automatic feed control section 66 sends divided driving pulses to the motor driver 51 so as to decelerate the pulse motor 23. Thereafter, the automatic feed control section 66 shuts off driving pulses to the motor driver 51 when the coincidence detection section 77 provides a coincidence signal.

If the trailing end of the negative film 18 comes off the rollers 20 while the negative film 18 is in inspection, it is impossible to position the negative film 18 with position data read out from the memory 75 in the print process. In order to avoid such a trouble, there is a film end sensor 80 and a counter 81 for stopping the pulse motor 23 at the end of print process. When the trailing end of the negative film 18 passes the perforation sensor 27, the perforation counter 70 stops to count perforation holes 18a while the negative film is traveling. The film end sensor 80 detects the duration of a predetermined period of time for which the perforation counter 70 continuously stops to count, thereby determining that the trailing end of the negative film 18 passed the rollers 20 to provide an end signal. Under the provision of the end signal, the counter 81 opens its gate so as to count driving pulses. When the counter 81 opens its gate so as to count driving pulses, the counter 81 counts a predetermined number of driving pulses as many as for, for example, one frame and a half, and the AND gate 67 is shut off, to stop the pulse motor 23 so as to terminate the transportation of the negative film 18. Thereafter, the pulse motor 23 is not caused to rotate even if the appropriate key is operated.

Figure 6:
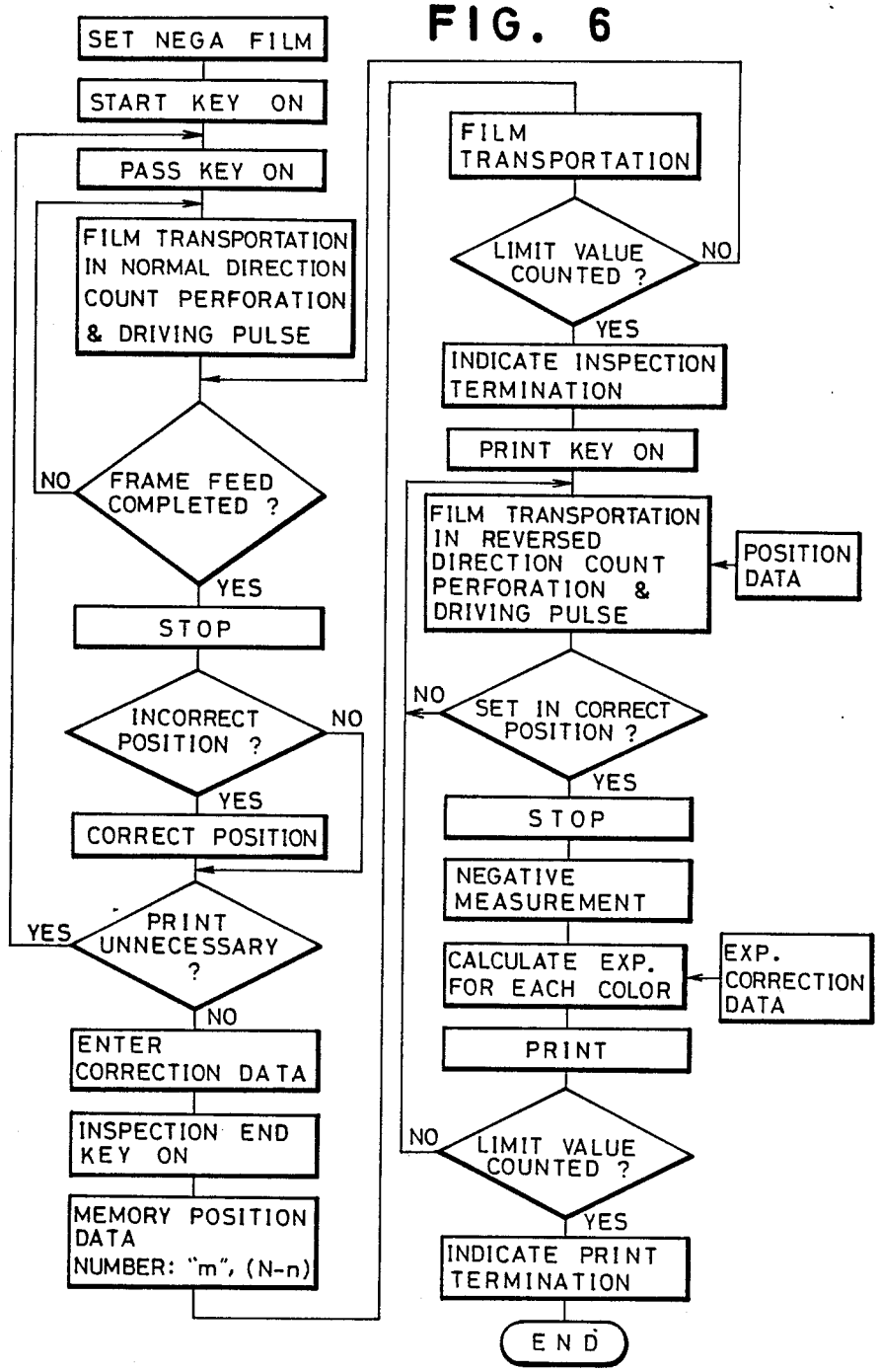
FIG. 6 is a flow chart showing the printing method according to a preferred embodiment of the present invention.

Reference is now made to FIG. 6 in order to describe the operation of the photographic printer described above. The start key 56 is turned ON after having set the negative film 18 between the rollers 19. Consequently, the controller 31 starts the programmed sequential operation of negative inspection. In the negative inspection process, the illumination lamp 10 emits dimmed light and the switch 30 selects the pulse trailing edge detection circuit 28. At the same time, the perforation counter 70 is reset and the flip-flop 69 is set. Consequently, the flip-flop 69 sends a "L" signal to the motor driver 51 through the OR gate 68, setting the pulse motor 23 for normal rotation, and setting the perforation counter 70 for counting up.

When the pass key 55 is operated, the frame feed control section 65 is actuated to transmit the predetermined number of driving pulses to the motor driver 51 through the AND gate 67 so as to make the pulse motor 23 rotate a certain number of revolutions, thereby rotating the two parts of rollers 19 and 20 to transport the negative film 18 by a distance equal to the pitch of the frame in the direction from the left to the right as viewed in FIG. 1 in the inspection process.

While the negative film 18 is transported, the perforation sensor 27 detects perforation holes 18a and sends a signal to the pulse trailing edge detection circuit 28. The pulse trailing edge detection circuit 28 detects the trailing edge of the pulse to provide an edge signal. The trailing edge signal is counted by the perforation counter 70, and the driving pulse counter 71 is reset.

While the negative film 18 is being transported, because the perforation sensor 27 detects a plurality of perforation 18a, the edge signal is periodically produced at a certain interval and counted by the perforation counter 70. Simultaneously, the driving pulse counter 71 repeatedly counts up driving pulses to detect the transported length of the negative film 18 for the interval required for the perforation counter 70 to increment its counted value by one.

After the negative film is transported by one frame, the negative film 18 is inspected visually through the framing mask 24. Specifically, at first, the negative film 18 is checked to determine whether the first picture frame is placed correctly in the printing position. If in fact the first frame is placed incorrectly, either one of the backward or forward movement keys 54a or 54b is operated to rotate the pulse motor 23 at a slow speed so as to move the negative film 18 slowly forward or backwards. At this time, the switch 30 selects the pulse leading edge and the pulse trailing edge detection circuit 28 and 29 according to the direction of rotation of the pulse motor 23, and the perforation counter 70 and the driving pulse counter 71 performs either an up- or down-counting operation. If the backward movement key 54a is operated to move back the negative film 18 by a distance larger than the distance between two perforation holes, then driving pulse counter 71 is reversed temporarily in its counting operation by the reversal means 74 to count up driving pulses starting at the provision of the edge signal by the pulse lending edge detection circuit 29 after having counted down to zero. If the negative film 18 is moved back excessively, the forward movement key 54b may be operated to disable the reversal means 74 so as to bring the driving pulse counter into count-up operation.

Then, a visual inspection is made to determine whether the first picture frame of the negative film 18 is suitable to be printed. If the picture frame is fuzzy, or extremely over- or under-exposed, the picture frame should not be printed. In this case, the pass key 55 is operated to transport the negative film 18 by one frame, so as to place the next picture frame in the printing position in the same way as described for the first picture frame. On the other hand, if the first picture frame can be printed, then the necessary data, such as density and/or color correction for a proper printing condition, are entered through the correction keys 59. The correction data is stored in the memory 61 along with reference data such as the operated number of the inspection end key 58 and read out in the print process to calculate a proper exposure for the picture frame.

After the visual inspection of the picture frame, the inspection end key 58 is turned on. As a result, the perforation counter 70 sends its counted value m to the memory 75, and the driving pulse counter 71 sends its counted value n to the subtraction section 76. At this time, the frame feed control section 65 is actuated to transport the negative film 18 by one frame. When an edge of a first perforation hole 18a is detected, the perforation counter 70 counts up and increments its count by one and the driving pulse counter 71 is reset. The counted value N of driving pulses at the moment the driving pulse counter 71 is reset is sent to the subtraction section 76 where a calculation is effected to obtain a difference (N - n). The numbers (N - n) and m are stored as position data of the first picture frame. In the case of a forward or backward position correction made by a distance longer than the distance between two perforation holes by either the forward or backward movement key 54b or 54a, the subtraction operation in the subtraction section 76 is skipped so that the counted value N, rather than (N-n) is sent to the memory 75.

In this way, the negative film 18 is transported frame by frame with or without conducting position correction and/or entering exposure correction data. In the inspection process, when the trailing end of the negative film 18 passes the perforation sensor 27, the perforation counter 70 stops to count up and the film end sensor 80 provides the counter 81 with an end signal to open the gate so as to start its counting operation. Because the perforation sensor 27 is disposed at a distance as far as one frame and a half from the center line of the exposure masking frame, the trailing end of the negative film 18 is detected only when the last picture frame is moved toward the printing position. After the detection of the trailing end of the negative film 18, the driving pulse counter 71 remains active to count up driving pulses continuously.

When inspection end key 58 is operated after the positioning of the last picture frame of the negative film 18, the position data for the last frame, namely the counted value by the driving pulse counter 71 is stored in the memory 75 without being subjected to any subtraction operation in the subtraction section 76. Thereafter, the pulse motor 23 is rotated in the forward or normal direction so as to transport the negative film 18 in the direction from the left to the right as viewed in FIG. 1. However, because the AND gate 67 closes when the counter 81 counts its limit countable value at the moment the negative film 18 is transported slightly, the pulse motor 23 stops its rotation and the driving pulse counter 71 and the counter 81 stop their counting operation. It is noted that, when the inspection end key 58 is operated after the inspection of the last picture frame, the frame feed control section may be disabled, and that the pulse motor 23 may be actuated simultaneously with the actuation of the counter 81 to transport the negative film 18 until the counter 81 counts its countable limit value when either the fine adjusting means 54 or the pass key 55 is operated.

When the pulse motor 23 stops its rotation, the indicator 62 is turned on and off to indicate a termination of the inspection process. When the print key 57 is operated to initiate the print process, the indicator 62 is kept turned on, and the flip-flop 69 and the counter 81 are reset. In the print process, position data is read out from the memory 75 to place each picture frame in the printing position. For example, the position data for the last picture frame of the negative frame 18 is read out from the memory 75 and, simultaneously, the counted values by the driving pulse counter 71 and the perforation counter 70 are set in the coincidence detection circuits 77 and 78, respectively.

Then, the automatic feed control section 66 transmits driving pulses to the motor driver 51 through the AND gate 67. On the other hand, since the flip-flop 69 provides the motor driver with a reverse signal, the pulse motor 23 starts to rotate in the reversed direction of rotation, so as to move back the negative film 18. While the negative film 18 is moved back, the driving pulse counter 71 counts down driving pulses. When the position data for a picture frame detected in the printing position coincides with the position data for the last picture frame read out from the memory 75, the coincidence detection circuit 77 provides a coincidence signal which causes the automatic feed control section 66 to stop the transmission of driving pulses to the motor driver 51 so as to stop the pulse motor 23. In this way, the last picture frame of the negative film 18 is placed in the same position as where it is placed upon inspection.

The controller 31, after having positioned the last picture frame in position, actuates the image scanner 33 to measure the transmitted light through the negative film 18 for three colors, namely red, green, and blue. The measured values for the three colors are transformed into density signals so as to extract characteristic values such as a large area transmittance density, a maximum density, a minimum density, and a density of a specified point for each color in the characteristic value calculation section, which are then sent to the controller 31. The controller 31 calculates exposures by the use of the characteristic values and the exposure correction data read out from the memory 61 for each color. According to the exposure thus calculated, the filter controller 15 controls each color filter 11, 12, and 13 to move into the printing path 16 one by one. When each color filter 11, 12, and 13 is inserted into the printing path 16, the illumination lamp 10 is excited to emit light to its full capacity for a certain period of time. During the excitation of the illumination lamp 10, the shutter controller 40 opens the shutter to expose the photographic paper 39 to the last picture frame of the negative film 18 thus projected.

After the exposure of the last picture frame of the negative film 18, the photographic paper 39 is transported by one frame to place unexposed part thereof in the printing position simultaneously with returning the color filters 11 to 13 to their initial position out of the printing path 16. Then, the position data for the next picture frame is read out from the memory 75 and set in the coincidence detection circuits 77 and 78 and, thereafter, the pulse motor 23 is actuated to rotate in the reverse direction of rotation. The driving pulse counter 71 counts down driving pulses until counting down to zero. Upon counting down to zero, the zero detection section 73 provides the reversing means 74 with a zero signal so as to reverse the driving pulse counter 71 to count up driving pulses. At this time, since the perforation sensor 27 detects a perforation hole 18a for the first time in the print process, the pulse leading edge detecting circuit 29 provides an edge signal which is counted down by the perforation counter 70.

As shown in FIG. 5(A), while the perforation counter 70 counts down and the driving pulse counter 71 counts up, the pulse motor 23 rotating in the reverse direction of rotation is stopped when the position data read from the memory 75 becomes coincident with position data for a picture frame. Then, the second-from-last picture frame is printed in the same manner for the first picture frame. In such a way, all the picture frames of the negative film 18 are printed frame by frame.

After the printing of the first picture frame of the negative film 18, when the negative film 18 forwarded again in the normal direction from the right to the left as viewed in position data for a picture frame as viewed in FIG. 1, the perforation sensor 27 detects the trailing end of the negative film 18 to disable the perforation counter 70. As a result, the film end sensor 80 provides an end signal with which the counter 81 is caused to count driving pulses. When the counter 81 counts up to its countable value limit, it provides an end signal as well as stops the pulse motor 23. As a result, the indicator 62 flashes to indicate the termination of the print process.

When a predetermined number of picture frames have been printed on the photographic paper 39, the cutter 49 is actuated to cut off the exposed part of the photographic paper 39. The exposed part of the photographic paper 39 thus cut off is then processed in the photographic processing section and cut individual prints.

In the above described embodiment, each picture frame of the negative film 18 is inspected visually to determine whether the picture frame is need not be printed and whether the picture frame includes a failure. In the case that all of the picture frames of the negative film 18 are to be printed and that the inspection of unnecessary picture frames and picture frames including a failure and the correction of failures are effected automatically, visual inspections may be omitted.

Figure 7:
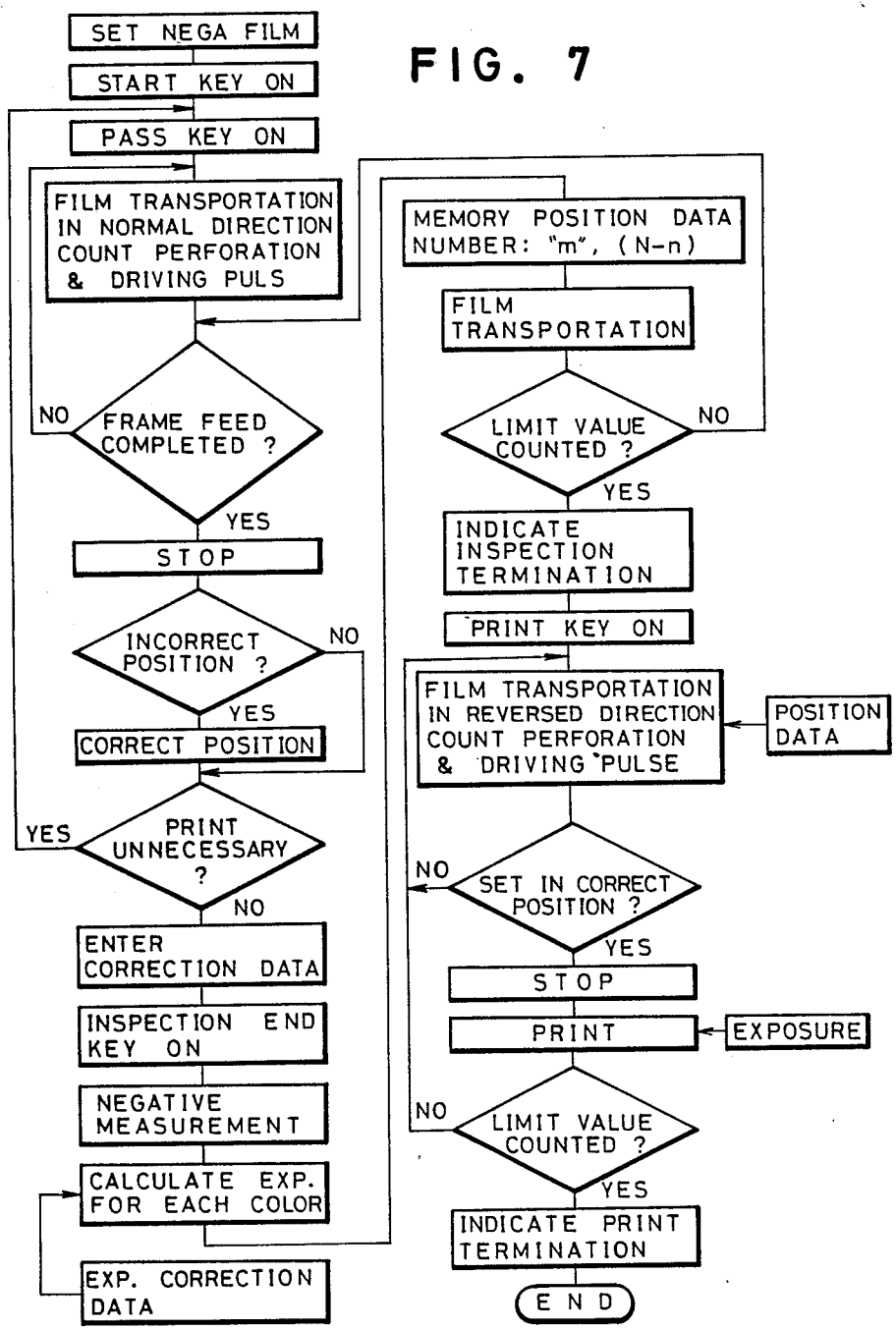
FIG. 7 is a flow chart showing the printing method according to another preferred embodiment of the present invention in which a light measurement is effected in the inspection process.

FIG. 7 shows a flow chart of the printing method according to another preferred embodiment of the present invention in which the image scanning is effected in the inspection process and the positioning is effected in the print process. In this embodiment, when the inspection end key 58 is operated, the image scanner 33 is actuated to measure a picture frame of the negative film 18 in the printing position. Based on characteristic values obtained from the image scanning and manually indicated exposure correction data, exposures for the respective colors are calculated and stored in the memory 61. The data on exposure is read out from the memory 61 in the print process after the positioning of each picture frame to effect a proper exposure.

Figure 8:
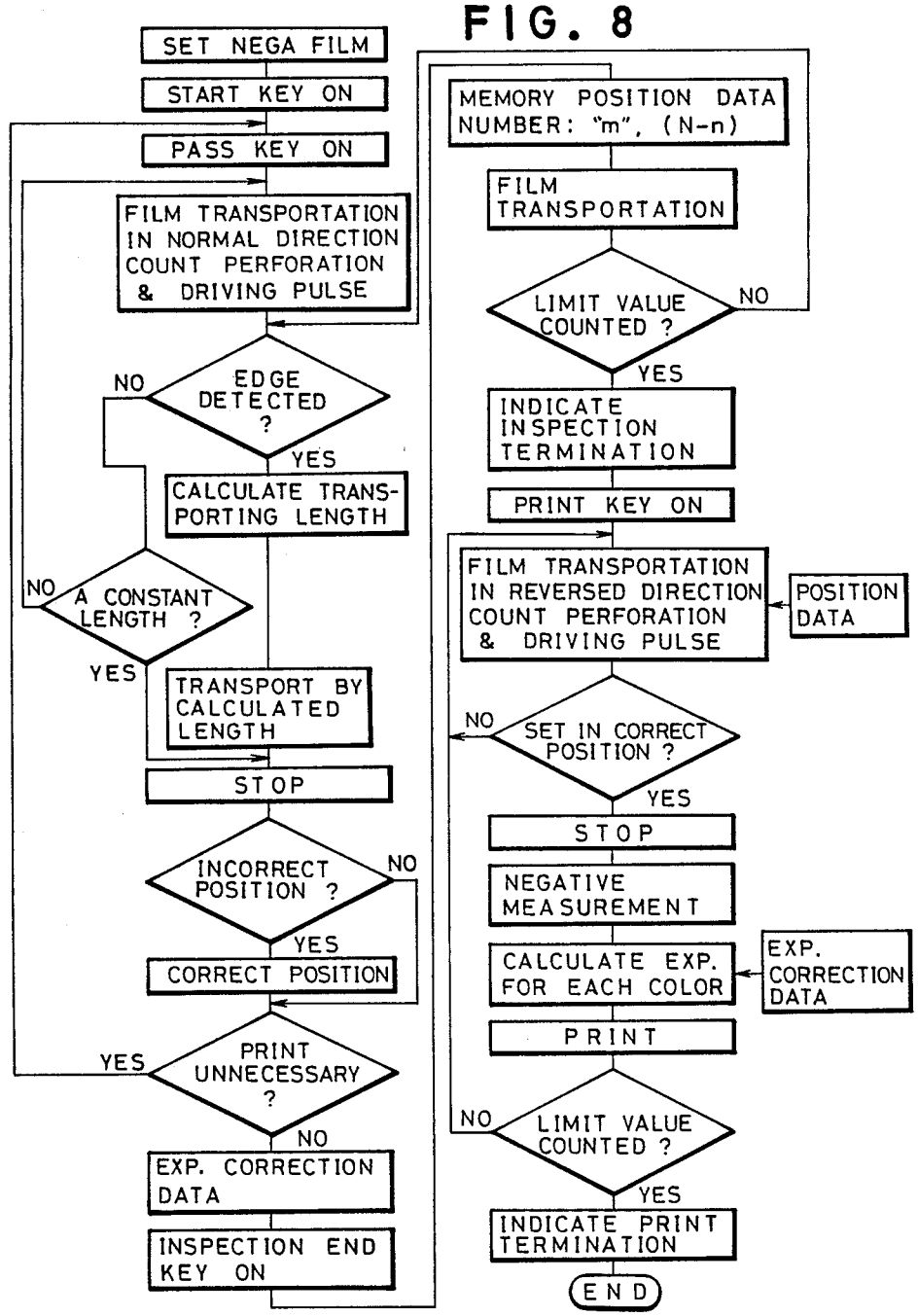
FIG. 8 is a flow chart showing the printing method according to still another preferred embodiment of the present invention in which a marginal edge of a picture frame is detected to place the picture frame in a printing position.

In place of transporting the negative film 18 by a predetermined length upon effecting the inspection of each picture frame, it may be possible to detect each picture frame itself to place the picture frame in position. For example, as shown in FIG. 8, a negative film may be placed in the printing position by detecting a marginal edge of each picture frame by the scanner 33 which is used to measure the density or transmittance of the picture frame. In an image inspection process, the scanner 33 is actuated to detect a marginal edge of each picture frame of a negative film 18. At the time the marginal edge is detected, a length by which the negative film 18 is transported during every inspection is set according to frame sizes, namely full-size and half-size frames. The pulse motor 23 is caused to rotate enough to transport the negative film 18 by the calculated length. Picture frames having images of artificially illuminated subjects or celestial objects are hard to be placed correctly in the printing position due to their fuzzy margins. For avoiding such incorrect positioning, the pulse motor 23 is forced to stop at the moment the negative film 18 is transported by the calculated length according to frame sizes. In this case, the negative film 18 is adjusted finely in position by operating the fine adjusting means 54.

Although, in the above described embodiments, the negative film is transported in the opposite direction between the inspection and print processes, the negative film may be transported in a same direction. In this case, although the negative film 18 passes the negative carrier twice, since position data of each picture frame is the same in both the inspection and print processes, it is sufficent to store a counted number of driving pulses applied to the pulse motor 23 without any change in number when the pulse motor is rotated in the normal direction to place each picture frame correctly in the printing position. If negative film 18 is moved back more than one perforation length by the fine adjustment means 54 to place the picture correctly in the printing position, the counted number of driving pulses should be changed before being stored in memory.

Although the present invention has been fully described by way of the preferred embodiments thereof with reference to the accompanying drawings, it is intended that the invention not be limited by any of the details of this description, unless otherwise specified, but rather be construed broadly within its spirit and scope as set out in the accompanying claims.

What is claimed is:

1. A photographic printing method for making prints of picture frames of a photographic film in which said photographic film is transported in one direction in an inspection process and in the opposite direction in a printing process, said method comprising the steps of:
   automatically controlling a pulse motor to transport said photographic film so as to place each picture frame in a printing position and, if needed, to finely adjust the position of said picture frame by the use of manually operated fine adjustment key means in said inspection process;
   counting perforation holes formed in said photographic film and counting driving pulses applied to said pulse motor starting with the detection of an edge of each of said perforation holes;
   storing position data representing the position of each picture frame to be printed, the stored position data comprising the counted number of said perforation holes and driving pulses in combination for each said picture frame to be printed placed in said printing position; and
   controlling said pulse motor with said position data to transport said photographic film so as to place said each picture frame to be printed in said printing position in said printing process.

2. A method as defined in claim 1, further comprising the steps of inspecting each picture frame placed in said printing position to determine whether said each picture frame is to be printed in said inspection process, and effecting a light measurement on said each picture frame determined to be printed and place again in said printing position, thereby performing an exposure control according to a result of said light measurement.

3. A method as defined in claim 1, further comprising the steps of inspecting each picture frame placed in said printing position to determine whether each said picture frame is to be printed and to enter exposure correction data for said each picture frame in said inspection process, and effecting a light measurement on said each picture frame determined to be printed and placed again in said printing position, thereby performing an exposure control according to a result of said light measurement and said exposure correction data.

4. A method as defined in any one of claims 2 or 3, wherein said photographic film is transported to place the next picture frame into said printing position after identifying a picture frame determined to be unnecessary to be printed in said printing position, and without storing position data of said picture frame determined to be unnecessary to be printed.

5. A method as defined in claim 1, further comprising the steps of effecting a light measurement for said photographic film frame by frame and collecting data on either one measured values and exposures obtained based on said measured values for all picture frames in said inspection process, and reading out said data for each picture frame placed in said printing position in said printing process, thereby performing an exposure control according to said data read out.

6. A method as defined in claim 1, further comprising the steps of inspecting each picture frame of said photographic film to determine whether said each picture frame is to be printed, effecting a light measurement on said each picture frame, collecting data on either one of a measured value and an exposure obtained based on said measured value for all picture frames in said inspection process, and reading out said data for each picture frame placed in said printing position in said printing process, thereby performing an exposure control according to said data read out.

7. A method as defined in claim 1, further comprising the steps of effecting on each picture frame placed in said printing position an inspection whether said each picture frame is to be printed, an input of data on exposure correction and a light measurement and collecting data on exposure obtained from said exposure correction data and measured value for all picture frames, in said inspection process, and reading out said exposure data for each picture frame placed in said printing position in said print process, thereby performing an exposure control according to said exposure data read out.

8. A method as defined in any one of claims 6 or 7, wherein said photographic film is transported to place the next picture frame in said printing position after identifying a picture frame determined unnecessary to be printed in said printing position, and without storing position data of said picture frame determined unnecessary to be printed.

9. A method as defined in any one of claims 1-3 or 5-7, wherein said photographic film is controllably transported by a constant length as long as an interval at which said perforation holes are formed, thereby placing said each picture frame in said printing position.

10. A method as defined in claim 1, wherein said photographic film is controllably transported to place a marginal edge of each picture frame at a particular position by detecting said marginal edge of said each picture frame, thereby placing said each picture frame in said printing position.

11. A photographic printer for making prints of picture frames of a photographic film in which said photographic film is transported in a first direction in an inspection process, and in a second direction which is opposite to the first direction in a print process, said printer comprising:
   a reversible pulse motor for transporting said photographic film in the first and second directions;
   means for applying a predetermined number of driving pulses to said pulse motor so as to transport said photographic film by a certain length in said first direction during said inspection process, thereby roughly adjusting a picture frame to a printing position;

a fine adjusting key manually operable to slightly turn said pulse motor for finely adjusting a picture frame of said photographic film to the printing position;

a perforation sensor for detecting perforation holes formed in said photographic film to provide a square wave signal;

first edge detecting means for detecting an edge of said perforation hole by detecting a trailing edge of said square wave signal provided by said perforation sensor, thereby providing a trailing edge signal;

second edge detecting means for detecting an edge of said perforation hole by detecting a leading edge of said square wave signal provided by said perforation sensor, thereby providing a leading edge signal;

a perforation counter caused to count up said perforation holes in response to one of said edge signals from said first and second edge detecting means during said inspection process, and to count down said perforation holes in response to one of said edge signals from the other edge detecting means during the print process;

a pulse counter which is reset in synchronism with the counting operation of said perforation counter for counting driving pulses applied to said pulse motor during the manual operation of the fine adjusting key;

operation means for calculating the difference (N - n) between the number N of driving pulses counted while said perforation sensor detects edges of each of two adjacent perforation holes and the number n of driving pulses counted until each picture frame is finely adjusted to said printing position;

a memory for storing as position data for each picture frame, said difference (N - n) and a counted number by said perforation counter; and means for controlling said pulse motor to rotate in said second direction so as to transport said photographic film until position data of a picture frame to be printed coincides with the position data of the same picture frame read out from said memory, thereby placing said picture frame to be printed in said printing position.

12. A method of printing a photographic film in which the film is transported in a first direction during an inspection process so that each picture frame contained on the film can be inspected visually and in which the film is transported in a second direction which is opposite to the first direction during a printing process so that each picture frame can be printed, the method comprising the steps of:

repeatedly applying a predetermined number of driving pulses to a pulse motor associated with the film to transport the film a predetermined length in the first direction;

counting the number of perforating holes formed on the film each time the film is transported the predetermined length, thereby providing a rough determination of each picture frame contained on the film;

manually actuating the pulse motor after each time the film is transported the predetermined length so that each picture frame is positioned in a correct printing position;

counting the number of manually actuated driving pulses necessary to place each picture frame in the proper printing position thereby providing a fine determination of the position of each picture frame;

storing as position data for each picture frame, the counted number of perforation holes and the counted number of manually actuated driving pulses;

reading out the position data for each picture frame; and controlling the pulse motor during the printing process so that each picture frame is placed in the proper printing position.

13. The method according to claim 12, further comprising the step of:

determining for each picture frame, whether that picture frame can be printed; and wherein position data is stored for only those picture frames which can be printed.

14. The method according to claim 13, further comprising the steps of:

calculating an exposure correction level for each picture frame which can be printed; and storing data representing the calculated exposure correction level for each picture frame for use during the printing process.

15. The method according to claim 13, further comprising the steps of:

determining a light measurement for each picture frame that can be printed; and storing data for each picture frame representing the determined light measurement for use during the printing process.

* * * * *